United States Patent Office 3,203,875
Patented Aug. 31, 1965

3,203,875
APPARATUS FOR DISTILLING WATER WITH
WASTE HEAT
Harold V. Sturtevant, 173 Northwood Ave.,
North Plainfield, N.J.
Filed Aug. 20, 1962, Ser. No. 218,001
4 Claims. (Cl. 202—173)

This invention relates to a system for purifying water. More particularly it relates to an apparatus and method for utilizing the waste heat from cooling units for distilling impure water to obtain pure water.

In many areas of the world the available water supply is either brackish, salty or otherwise unfit for use and the cost of purification by presently available methods is extremely high. In many of these areas the average daily temperature, at least during some portion of the year, is such that air conditioning equipment is essential to human comfort. Many of the air conditioning units are of the absorption type which require a source of heat and also utilize flowing water through heat exchangers to dissipate heat. The dissipated heat is ordinarily simply discharged to the atmosphere as waste. The heat values are therefore lost.

It is an object of this invention to provide distilled water at a low cost.

It is a further object of this invention to convert impure to pure water by a distillation procedure which utilizes waste heat from absorption type air conditioning equipment.

These and other objects of the invention are achieved by providing an apparatus in which the heat values evolved in various elements of the air conditioning units are transferred to circulating impure water which is then vaporized. The vapors are condensed and the pure water collected.

Figure 1:
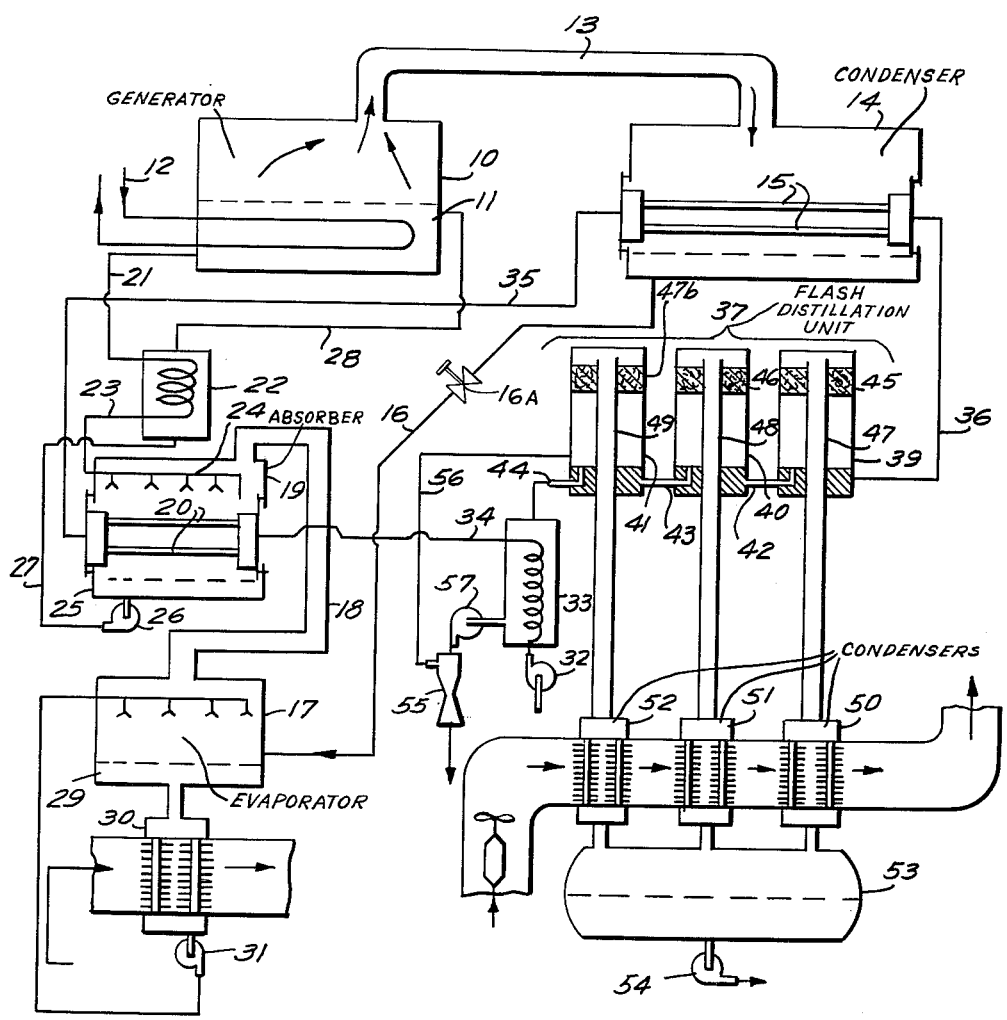
Figure 2:
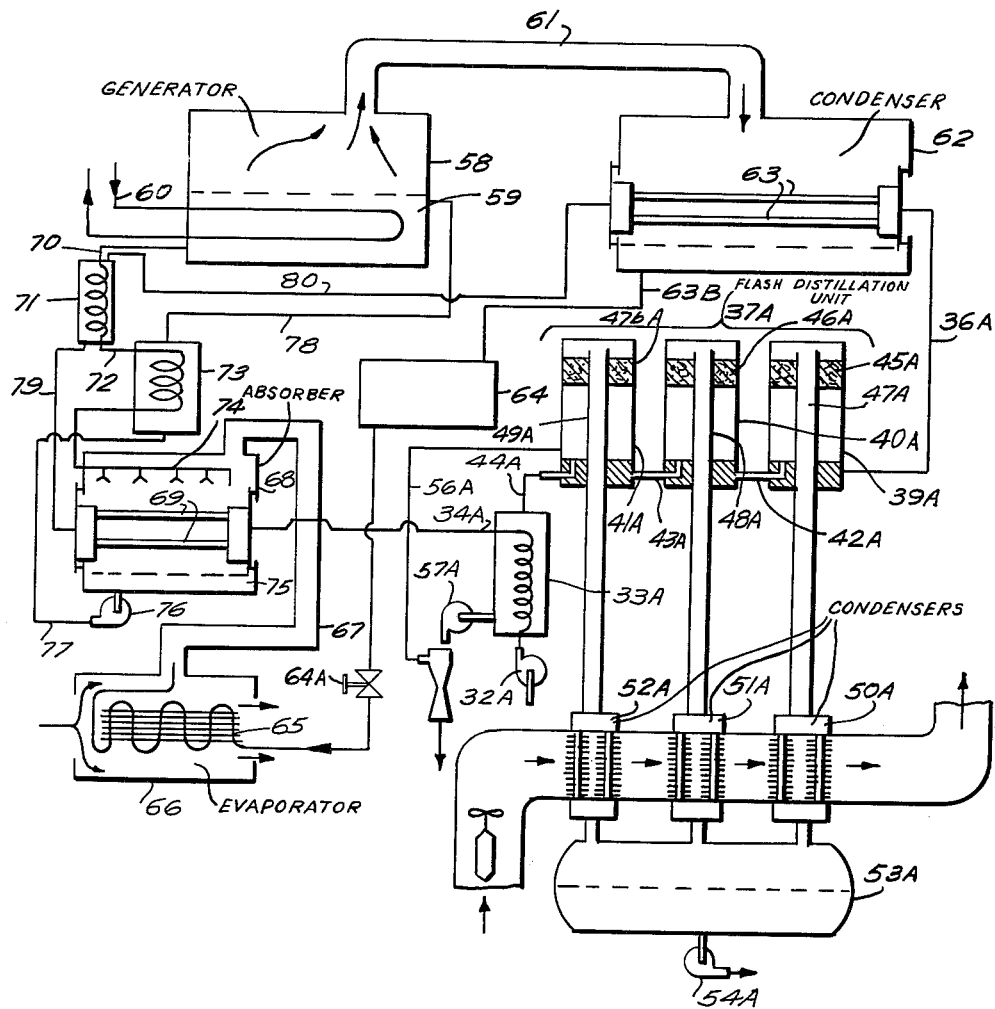

The invention will be better understood by reference to the following detailed description of the manner in which I now prefer to practice the invention, which description should be considered in connection with the accompanying drawings, in which:

FIG. 1 is a schematic view of the invention as used with a lithium bromide type air conditioner; and FIG. 2 is a schematic view of the invention as used with an ammonia type air conditioner.

The lithium bromide type air conditioner is well known in the art. Its operation depends on the fact that a concentrated aqueous solution of lithium bromide has a lower vapor pressure than pure water. Hence, in a closed system water will evaporate from a pure water source and be absorbed into a concentrated solution. The evaporation requires heat energy and this is obtained from the medium to be cooled. The absorption generates heat and it is necessary to conduct this heat out of the system. The total effect is that heat values are taken from the medium to be cooled, transferred to the concentrated absorbing solution and then removed from the absorbing solution. This heat is termed load heat.

The essential parts of a lithium bromide system are the generator, condenser, evaporator and absorber. In the generator a concentrated aqueous solution of lithium bromide is heated to produce water vapor which is condensed in the condenser. The condensed water then passes to the evaporator which is connected to the absorber, for example by a pipe which permits the passage of water vapor from the evaporator to the absorber. Concentrated solution from the generator is permitted to flow into the absorber and because of the difference in vapor pressure between the concentrated solution in the absorber and the pure water in the evaporator, water evaporates from the evaporator and is absorbed in the absorber.

A lithium bromide system uses cooling water to condense the water vapor in the condenser and to remove the load heat from the absorber. The heat values picked up by the cooling water are wasted.

The ammonia type absorption air conditioner is similar to the lithium bromide type. There is a generator, a condenser, a cooler and an absorber. A concentrated solution of ammonia in water is heated in the generator to drive off ammonia vapor which is condensed in the condenser. Between the condenser and the cooler a receiver is located where liquid ammonia from the condenser is collected. The liquid ammonia vaporizes into the cooler and in so doing takes heat values from the medium to be cooled. The vapors then pass to the absorber. The absorber contains a relatively dilute solution of aqueous ammonia drawn off from the bottom of the generator. The ammonia vapors from the cooler are absorbed into this solution and in so doing generate a heat of absorption corresponding to the load heat in the lithium bromide system. The strong solution is then returned to the generator to complete the cycle.

An ammonia system like the lithium bromide system uses cooling water in the condenser and the absorber. Cooling water is also employed to cool the dilute solution as it passes from the generator to the absorber. This cooling is necessary to insure that the solution in the absorber is cool enough so that ammonia vapors are absorbed rather than driven off. All of the heat values absorbed by the cooling water are wasted in the ordinary use of the ammonia system. In accordance with this invention these heat values are used in the production of pure water.

Referring now to the figures, the numeral 10 represents the generator in a lithium bromide system containing concentrated solution 11. The solution 11 is heated by a heat source generally represented by the numeral 12. The heat source is conventional and is not shown. Conveniently it may be circulating hot water or steam. Water vapor from the generator 10 passes through pipe 13 to condenser 14 where it is cooled and condensed by cooling water passing through coils 15. The condensed water collects at the bottom of condenser 15 and flows through pipe 16 to evaporator 17. Pipe 16 contains an expansion valve 16A to prevent evaporation from taking place before the liquid reaches the evaporator. The water in the evaporator vaporizes and the vapors flow through pipe 18 and into absorber 19. In absorber 19 concentrated lithium bromide solution 11 from generator 10 cascades over cooling coils 20. This solution passes from the generator 10 to the absorber 19 through pipe 21 into heat exchanger 22 and then into pipe 23 to cascade 24. Because of the low vapor pressure of the lithium bromide solution compared to the vapor pressure of the water in the evaporator 17, water vapor, as aforesaid, passes from the evaporator to the absorber. The load heat is taken up by the cooling water flowing through coils 20.

The solution 25 of aqueous lithium bromide collects at the bottom of the absorber 19. This solution is now diluted because of the absorption of water vapor. It is pumped back to the generator 10 by means of pump 26 through pipes 27 and 28. During its flow it passes through heat exchanger 22 where it serves as the cooling medium to cool the solution 11. It is necessary that this solution be cooled so that its vapor pressure will remain below the vapor pressure of the water in evaporator 17.

The liquid water 29 in the evaporator 17 is cooled by vaporization. This cooled water is pumped through radiator 30 by pump 31 where it abosrbs heat from the medium to be cooled, shown in the figures as circulating air. The cooling cycle of the air conditioning unit is thus completed.

Cooling water for the coils 15 in the condenser 14 and the coils 20 in the absorber 19 enters the system through pump 32. This is the impure water which is to be provided for distillation. It passes first through heat exchanger 33 where it is initially warmed as will be explained more fully hereinafter. Leaving heat exchanger 33 it passes through pipe 34 to cooling coils 20 where it absorbs load heat in the absorber 19. It next flows through pipe 35 to coils 15 in condenser 14 where it picks up heat values from the condensation of the water vapors coming through pipe 13. From coils 15 the water, which is now at an elevated temperature, flows through pipe 36 to the first stage of a three stage flash distillation unit generally represented by numeral 37.

The low pressure distillation unit as shown comprises three evaporating tanks 39, 40 and 41 interconnected by tubes 42 and 43 through which unevaporated water flows from one tank to the other. A tube 44 in tank 41 provides a conduit by which unevaporated water flows from the distillation unit 37 to heat exchanger 33 where it gives up residual heat values to the impure water being pumped to the heat exchanger 33 from pump 32.

Each of the tanks 39, 40 and 41 is provided with a demistor represented by the numerals 45, 46 and 47b. Pipes 47, 48 and 49 provide a passage for water vapor in each of the tanks down to air cooled condensers 50, 51 and 52 where the vapor condenses and is collected in tank 53 which is shown as provided with a water circulating pump 54.

The distillation unit operates at a pressure somewhat below atmospheric. The low pressure is obtained by means of eductor 55 which is connected to the unit 37 by suction line 56. Suction is created by pumping the water from heat exchanger 33 through the eductor 55 by means of pump 57.

The operation of the distillation unit is as follows: Water to be distilled is pumped into the system and heated at heat exchanger 33, coils 20 and coils 15. The heated water then passes to the distillation unit 37 maintained at below atmospheric pressure by the operation of eductor 55. In each of the tanks 39, 40 and 41, a certain amount of water vapor is produced. Any liquid water entrained in the vapor is removed by passing through either of demistors 45, 46 and 47b and the dried vapor is condensed by means of air cooled condensers 50, 51 and 52. The impure water which originally entered the system at 32 is, therefore, vaporized and condensed to produce pure water.

Not all of the water which enters the system is distilled. One reason for this is to prevent accumulation of precipitated salts on the surface of the distillation unit. Obviously, if all of the water which entered the distillation unit was converted to vapor any low volatile solids contained in the water would be precipitated in the tanks. The unevaporated water is fairly highly concentrated in dissolved salts but not concentrated to the point of precipitation.

In preferred operations the pipes and coils in the distillation unit are fabricated of corrosion resistant metal. Also the coils are designed for easy accessibility to permit easy removal and cleaning.

FIG. 2 shows the distillation unit in combination with an ammonia type absorption cooling unit. In the figure, 58 is the generator containing concentrated aqueous ammonia solution 59 heated by heat source 60. Ammonia vapors pass through pipe 61 to condenser 62 where they give up their heat values to water circulating through coils 63. The system is a closed system so that the ammonia vapors are under sufficient pressure to condense when cooled by the circulating water. The condensed ammonia collects at the bottom of the condensing unit 62 and flows through pipe 63B to receiver 64. The pipe connecting receiver 64 and evaporator 66 contains an expansion valve 64A to prevent evaporation from taking place before the liquid reaches the evaporator. The liquid ammonia evaporates through coil 65 in evaporator 66 and in so doing lowers the temperature of the medium it is desired to cool which may be air or water passing through the evaporator. The ammonia vapor passes through pipe 67 into the absorber 68. In the absorber the heat of absorption or load heat is taken up by circulating water in coils 69. The solution 59 from generator 58 passes through pipe 70 to heat exchanger 71 and then through pipe 72, heat exchanger 73 and on to cascade 74 in absorber 68. It is essential that the solution passing through the cascade 74 be cool enough to absorb ammonia vapor and not evolve it.

The solution 75 in the absorber is recirculated back to the generator 58 through pump 76 and pipe 77. In passage from pipe 77 it goes through heat exchanger 73 where it absorbs heat values from solution 59. It exits from heat exchanger 73 through pipe 78 into the generator 58. This completes the cooling cycle.

The distillation apparatus utilized in connection with the ammonia system is similar to the apparatus used with the lithium bromide system except for the additional heat exchanger 71 which receives water from coils 69 through pipe 79. Water passes from heat exchanger 72 through pipe 80 to coils 63 in the condenser 62. Therefore, corresponding parts are similarly numbered with the addition of the letter A. It will be noted that impure water enters the system through the pump 32A, passes through heat exchanger 33A where it is warmed by concentrated unevaporated solution from distillation unit 37A. From the heat exchanger 33A it goes to coil 69, then to heat exchanger 71. In heat exchanger 71, it absorbs heat values from the solution in the generator 58 as this solution passes to the absorber 68. After passing through heat exchanger 71 the impure water to be distilled passes through coil 63 in condenser 62 before passing into distillation unit 37A.

The apparatus of this invention may be profitably utilized with any size air conditioning equipment and is capable of utilizing practically all of the waste heat. It is not, however, always practical to do so. For example, as explained above, it is preferred to maintain the concentration of salts in the water of the distillation unit at a level where they will not precipitate from solution. This can mean that as much as 50% of the water entering the system is not distilled. This water will draw off some of the heat which it absorbs in going through the heat producing elements of the air conditioning unit. Large amounts of this heat can be recovered by the use of a heat exchanger, i.e., element 33 or 33A as described above. The heat exchanger is not, however, essential to the invention and even when used it is impractical to design it so as to reduce the temperature of the exit water to the exact temperature of the entrance water.

In the operation of the combination of the invention the flow of impure water is controlled so that in passing through the cooling unit it reaches a temperature for convenient distillation. A suitable operating temperature range is from about 100° F. to about 200° F., preferably 170° F. to 185° F. Heating the water to be purified to within this range does not in any way interfere with the operation of the air conditioning unit. In this pressure range the pressure in the distillation unit is from about 0.94 to about 11.5 lbs./sq. in. absolute (p.s.i.a). These pressures are readily achieved with the usual form of eductor, although, if desired, any other type of vacuum pump can be employed.

In a typical conversion of salt water to distilled water in an apparatus of this invention, the water enters the system at a temperature of 65° F. and after passing through the condenser enters the first tank of the distillation unit at a temperature of 180° F. In the first tank the pressure is 7.5 p.s.i.a. Unevaporated water passes to the next stage where water vapor is produced at 140° F. and the remaining water passes into the last stage where vapor is produced at 120° F. Approximately 50% of the entering salt water is converted to distilled water. The remaining brine is discarded.

The distillation apparatus of this invention is readily installed even on existing equipment. Once installed, it may be operated for at least the life of the cooling unit with a minimum of maintenance cost. It can be made to any desired specifications to utilize any amount of the waste heat associated with the operation of air conditioning equipment. Since the heat source utilized in its operation is heat that is ordinarily wasted, its use is extremely attractive from an economic viewpoint.

While the description of the invention has been given in terms of what are presently considered to be the preferred embodiments, it will be obvious to those skilled in the art that various changes and modifications can be made therein without departing from the spirit and scope of the invention. It is the intention, therefore, that the appended claims cover all such changes and modifications as fall within the spirit and scope of the invention.

What I claim is:

1. In apparatus for the distillation of water, the combination comprising a closed generator containing a concentrated solution of refrigerant, means for heating said refrigerant disposed within said generator, a condenser, means effecting refrigerant vapor communication between said generator and said condenser, an evaporator, means establishing fluid flow communication between said condenser and said evaporator, first heat exchanger means disposed within said evaporator for lowering the temperature of a fluid medium to be cooled, an absorber containing a concentrated solution of cooled absorbent refrigerant, closed passage means interposed between said generator and said absorber, said passage means including a second heat exchanger means for cooling the concentrated solution of absorbent refrigerant received from said generator and being passed to said absorber, piping means for creating refrigerant vapor flow from the evaporator to the absorber, closed passage means for returning the diluted solution of absorbent refrigerant formed at the bottom of the absorber to the generator, said last mentioned passage means including coil means for said second heat exchanger means, pumping means for circulating said water to be distilled, a third heat exchanger through which said water initially passes, a first cooling coil disposed within said absorber, a second cooling coil disposed within said condenser; a closed circuit interconnecting said third heat exchanger means, said first cooling coil and said second cooling coil for the flow of said water to be distilled; a flash distillation unit comprising an evaporating tank, means interconnecting said second cooling coil with said evaporating tank, an eductor in communication with said tank for maintaining a below atmospheric pressure therein, a final condenser operatively connected to said tank for condensing the water vapor formed in said evaporation tank, and means for collecting the condensate of the distilled water so formed.

2. In apparatus for the distillation of water, the combination comprising a generator containing a concentrated solution of refrigerant, means for heating said refrigerant disposed within said generator, a condenser, means effecting vapor communication between said generator and said condenser, an evaporator, means establishing fluid flow communication between said condenser and said evaporator, first heat exchanger means for lowering the temperature of a fluid medium to be cooled, first pumping means for withdrawing liquid from the evaporator and passing said liquid through said first heat exchanger means wherein it absorbs heat from the medium to be cooled, an absorber containing a concentrated solution of cooled absorbent refrigerant, closed passage means interposed between said generator and said absorber, said passage means including a second heat exchanger means for cooling the concentrated solution of absorbent refrigerant received from said generator and being passed to said absorber, piping means for creating vapor flow from the evaporator to the absorber, closed passage means for returning the diluted solution of absorbent refrigerant formed at the bottom of the absorber to the generator, said last mentioned passage means including coil means for said second heat exchanger means, second pumping means for circulating said water to be distilled, a third heat exchanger means through which said water initially passes, a first cooling coil disposed within said absorber, a second cooling coil disposed within said condenser; a closed circuit interconnecting said second pumping means, said third heat exchanger means, said first cooling coil and said second cooling coil for the flow of said water to be distilled; a flash distillation unit comprising an evaporating tank, means interconnecting said second cooling coil with said evaporating tank, an eductor in communication with said tank for maintaining a below atmospheric pressure therein, final condenser means operatively connected to said tank for condensing the water vapor formed in said evaporation tank, and means for collecting the condensate of the distilled water so formed.

3. In apparatus for the distillation of water, the combination comprising a closed generator containing a concentrated solution of refrigerant, means for heating said refrigerant disposed within said generator, a closed condenser, means effecting water vapor communication between said generator and said condenser, an evaporator, means establishing fluid flow communication between said condenser and said evaporator, first heat exchanger means for lowering the temperature of a fluid medium to be cooled, first pumping means for withdrawing liquid water from the evaporator and passing said water through said first heat exchanger means wherein it absorbs heat from the medium to be cooled and returning said water to the evaporator, an absorber containing a concentrated solution of cooled absorbent refrigerant, closed passage means interposed between said generator and said absorber, said passage means including a second heat exchanger means for cooling the concentrated solution of absorbent refrigerant received from said generator and being passed to said absorber, piping means for creating water vapor flow from the evaporator to the absorber, closed passage means for returning the diluted solution of absorbent refrigerant formed at the bottom of the absorber to the generator, said last named passage means including second pumping means, said last named passage means including coil means for said heat exchanger means, third pumping means for circulating said water to be distilled, a third heat exchanger means through which said water intiially passes, a first cooling coil disposed within said absorber, a second cooling coil disposed within said condenser; a closed circuit interconnnecting said third pumping means, said third heat exchanger means, said first cooling coil and said second cooling coil for the flow of said water to be distilled; a flash distillation unit comprising a first evaporating tank, a second evaporating tank, a third evaporating tank, means sequentially interconnecting said second cooling coil, said first tank, said second tank and said third tank, an eductor in communication with said tanks for maintaining a below atmospheric pressure therein, a demistor being provided for each of said tanks, a final air cooled condenser being operatively connected to each of said tanks for condensing the water vapor formed in said evaporation tanks, and means for collecting the condensate of the distilled water so formed.

4. In apparatus for the distillation of water, the combination comprising a closed generator containing a concentrated solution of refrigerant, means for heating said refrigerant disposed within said generator, a condenser, means effecting water vapor communication between said generator and said condenser, an evaporator, means establishing fluid flow communication between said condenser and said evaporator, first heat exchanger means disposed within said evaporator for lowering the temperature of the fluid medium to be cooled, first pumping means for withdrawing cooled liquid water from the evaporator and passing said water through said heat exchanger means where it absorbs heat from the medium to be cooled, an absorber containing a concentrated solution of cooled absorbent refrigerant, closed passage means interposed between said generator and said absorber, said passage means including a second heat exchanger means and a third heat exchanger means for cooling the concentrated solution of absorbent refrigerant received from said generator and being passed to said absorber, piping means for establishing vapor flow from the evaporator to the absorber, closed passage means for returning the diluted solution of absorbent refrigerant formed at the bottom of the absorber to the generator, said last named passage means including first pumping means, said last named passage means including coil means for said third heat exchanger means, second pumping means for circulating said water to be distilled, a fourth heat axchanger means through which said water initially passes, a first cooling coil disposed within said absorber, a second cooling coil disposed within said condenser; a closed circuit interconnecting said second pumping means, said fourth heat exchanger means, said first cooling coil, said second heat exchanger means, and said second cooling coil for the flow of the water to be distilled; a flash distillation unit comprising a first evaporator tank, a second evaporator tank, a third evaporator tank, means sequentially interconnecting said second cooling coil, said first tank, said second tank and said third tank, an eductor in communication with said tanks for maintaining a below atmospheric pressure therein, a demistor, final air cooled condenser means being operatively connected to each of said tanks for condensing the water vapor formed in said evaporation tanks, and means for collecting the condensate of the distilled water so formed.

References Cited by the Examiner

UNITED STATES PATENTS

| | | | |
|---|---|---|---|
| 1,466,670 | 9/23 | Monti | 202—75 |
| 2,127,004 | 8/38 | Nelson | 202—75 |
| 2,516,093 | 7/50 | Ruff | 202—75 |
| 2,643,974 | 6/53 | Implagliazzo. | |
| 2,726,519 | 12/55 | Squier | 62—238 X |
| 2,893,926 | 7/59 | Worthen et al. | |
| 2,908,618 | 10/59 | Bethon. | |
| 2,909,905 | 10/59 | Mitchell et al. | 62—485 X |
| 2,991,004 | 1/60 | Wood. | |

OTHER REFERENCES

German application Ser. No. K 24,930, printed Dec. 13, 1956.

NORMAN YUDKOFF, *Primary Examiner.*